US 8,520,050 B2

(12) United States Patent
Blackburn et al.

(10) Patent No.: US 8,520,050 B2
(45) Date of Patent: Aug. 27, 2013

(54) COMMUNICATION SYSTEM AND METHOD

(75) Inventors: Helen Blackburn, London (GB); Mark McLaughlin, Woking (GB); Marek Laasik, Tallinn (EE)

(73) Assignee: Skype, Dublin (IE)

( * ) Notice: Subject to any disclaimer, the term of this patent is extended or adjusted under 35 U.S.C. 154(b) by 606 days.

(21) Appl. No.: 12/455,085

(22) Filed: May 28, 2009

(65) Prior Publication Data

US 2010/0064334 A1 Mar. 11, 2010

(30) Foreign Application Priority Data

Sep. 5, 2008 (GB) .................................. 0816281.0

(51) Int. Cl.
*H04N 7/14* (2006.01)
(52) U.S. Cl.
USPC ..................................... 348/14.01; 348/14.04
(58) Field of Classification Search
USPC .......... 348/14.01, 14.04, 14.07, 14.08, 14.09, 348/14.02; 370/260
See application file for complete search history.

(56) References Cited

U.S. PATENT DOCUMENTS

| | | | |
|---|---|---|---|
| 5,506,572 A | 4/1996 | Hills et al. |
| 5,587,928 A | 12/1996 | Jones et al. |
| 5,812,770 A | 9/1998 | Sakai |
| 5,856,821 A | 1/1999 | Funahashi |
| 5,923,737 A | 7/1999 | Weishut et al. |
| 5,999,207 A | 12/1999 | Rodriguez et al. |
| 6,061,434 A | 5/2000 | Corbett |
| 6,151,619 A | 11/2000 | Riddle |
| 6,184,905 B1 | 2/2001 | Hartog |
| 6,209,025 B1 | 3/2001 | Bellamy |
| 6,243,129 B1 | 6/2001 | Deierling |
| 6,286,140 B1 | 9/2001 | Ivanyi |
| 6,628,964 B1 | 9/2003 | Bates et al. |
| 6,636,269 B1 | 10/2003 | Baldwin |
| 6,789,105 B2 | 9/2004 | Ludwig et al. |

(Continued)

FOREIGN PATENT DOCUMENTS

| | | |
|---|---|---|
| DE | 19971016486 A1 | 9/1998 |
| DE | 102006001607 | 8/2006 |

(Continued)

OTHER PUBLICATIONS

Search Report for Application No. GB0816281.0, dated Nov. 20, 2009, consisting of 2 pages.

(Continued)

*Primary Examiner* — Stella Woo
(74) *Attorney, Agent, or Firm* — Wolfe-SBMC

(57) ABSTRACT

A method of transmitting video data comprising: establishing a bidirectional video channel between a first terminal and a second terminal in a packet-based communication network; beginning a live, face-to-face video call over the established channel by generating first video data from a video camera of the first terminal, transmitting the first video data to the second terminal for display on a screen of the second terminal, receiving second video data generated from a video camera of the second terminal, and displaying the second video data on a screen of the first terminal; generating third video data at the first terminal from a source other than the video camera of the first terminal; receiving a user selection at the first terminal; and in response to the user selection, transmitting the third video data to the second user over the established channel of the packet-based communication network.

20 Claims, 4 Drawing Sheets

(56) References Cited

U.S. PATENT DOCUMENTS

| | | |
|---|---|---|
| 6,930,661 B2 | 8/2005 | Uchida et al. |
| 7,058,901 B1 | 6/2006 | Hafey et al. |
| 7,099,693 B2 | 8/2006 | Shin |
| 7,184,049 B2 | 2/2007 | Ballin et al. |
| 7,454,711 B2 | 11/2008 | Angiulo et al. |
| 7,573,988 B2 | 8/2009 | Lee et al. |
| 7,587,684 B2 | 9/2009 | Perttula |
| 7,954,124 B2 | 5/2011 | Rambo |
| 7,966,039 B2 | 6/2011 | Sadovsky et al. |
| 7,983,722 B2 | 7/2011 | Lowles et al. |
| 8,407,749 B2 | 3/2013 | McLaughlin et al. |
| 8,413,199 B2 | 4/2013 | Laasik et al. |
| 8,421,839 B2 | 4/2013 | Kert |
| 8,473,994 B2 | 6/2013 | Blackburn et al. |
| 8,489,691 | 7/2013 | Blackburn et al. |
| 2001/0005197 A1 | 6/2001 | Mishra et al. |
| 2002/0109770 A1 | 8/2002 | Terada |
| 2002/0144259 A1 | 10/2002 | Gutta et al. |
| 2002/0199181 A1 | 12/2002 | Allen |
| 2003/0009768 A1 | 1/2003 | Moir |
| 2003/0036683 A1 | 2/2003 | Kehr et al. |
| 2003/0052648 A1 | 3/2003 | Hara et al. |
| 2003/0061033 A1 | 3/2003 | Dishert |
| 2003/0070177 A1 | 4/2003 | Kondo et al. |
| 2003/0070182 A1 | 4/2003 | Pierre et al. |
| 2003/0097661 A1 | 5/2003 | Li et al. |
| 2003/0105812 A1 | 6/2003 | Flowers et al. |
| 2003/0117419 A1 | 6/2003 | Hermanson |
| 2003/0142802 A1 | 7/2003 | Hong et al. |
| 2004/0003025 A1 | 1/2004 | Hao |
| 2004/0049624 A1 | 3/2004 | Salmonsen |
| 2004/0060067 A1 | 3/2004 | Yi |
| 2004/0128700 A1 | 7/2004 | Pan |
| 2004/0135819 A1 | 7/2004 | Maa |
| 2004/0163127 A1 | 8/2004 | Karaoguz et al. |
| 2004/0176132 A1 | 9/2004 | Thrasher |
| 2004/0207723 A1* | 10/2004 | Davis et al. ........ 348/14.04 |
| 2004/0214541 A1 | 10/2004 | Choi |
| 2004/0258059 A1 | 12/2004 | Frank et al. |
| 2005/0071686 A1 | 3/2005 | Bagga et al. |
| 2005/0146598 A1 | 7/2005 | AbiEzzi et al. |
| 2005/0165922 A1 | 7/2005 | Hatano |
| 2005/0190700 A1 | 9/2005 | Melpignano |
| 2005/0249196 A1 | 11/2005 | Ansari et al. |
| 2005/0286711 A1 | 12/2005 | Lee et al. |
| 2005/0289480 A1 | 12/2005 | Mathews et al. |
| 2006/0040638 A1 | 2/2006 | McQuaide, Jr. |
| 2006/0080713 A1 | 4/2006 | Fujibayashi et al. |
| 2006/0095754 A1 | 5/2006 | Hyder et al. |
| 2006/0109268 A1 | 5/2006 | Napoli et al. |
| 2006/0181548 A1 | 8/2006 | Hafey et al. |
| 2006/0190443 A1 | 8/2006 | Mathews et al. |
| 2007/0039025 A1* | 2/2007 | Kraft et al. ........ 348/14.01 |
| 2007/0115346 A1* | 5/2007 | Kim et al. ........ 348/14.02 |
| 2007/0118866 A1 | 5/2007 | Chen |
| 2007/0139514 A1 | 6/2007 | Marley |
| 2007/0147367 A1 | 6/2007 | Hwang et al. |
| 2007/0156686 A1 | 7/2007 | Kim et al. |
| 2007/0214482 A1 | 9/2007 | Nguyen |
| 2007/0216759 A1* | 9/2007 | Gonen et al. ........ 348/14.01 |
| 2007/0275766 A1 | 11/2007 | Kim et al. |
| 2007/0279482 A1 | 12/2007 | Oswald et al. |
| 2008/0031169 A1 | 2/2008 | Shi et al. |
| 2008/0034325 A1 | 2/2008 | Ording |
| 2008/0062249 A1 | 3/2008 | Nagase et al. |
| 2008/0066131 A1 | 3/2008 | Chang et al. |
| 2008/0150892 A1 | 6/2008 | Duhig et al. |
| 2008/0152110 A1 | 6/2008 | Underwood et al. |
| 2008/0186410 A1 | 8/2008 | Hardacker et al. |
| 2009/0036159 A1 | 2/2009 | Chen |
| 2009/0167839 A1* | 7/2009 | Ottmar ........ 348/14.08 |
| 2009/0320073 A1 | 12/2009 | Reisman |
| 2010/0005497 A1 | 1/2010 | Maresca |
| 2010/0058408 A1 | 3/2010 | LaFreniere et al. |
| 2010/0060477 A1 | 3/2010 | Laasik et al. |
| 2010/0060715 A1 | 3/2010 | Laasik et al. |
| 2010/0060716 A1 | 3/2010 | Kert |
| 2010/0060788 A1 | 3/2010 | Blackburn et al. |
| 2010/0064328 A1 | 3/2010 | Laasik et al. |
| 2010/0064329 A1 | 3/2010 | McLaughlin et al. |
| 2010/0064333 A1 | 3/2010 | Blackburn et al. |
| 2011/0043599 A1 | 2/2011 | Luo et al. |
| 2011/0173672 A1 | 7/2011 | Angiolillo et al. |

FOREIGN PATENT DOCUMENTS

| | | |
|---|---|---|
| EP | 0741484 A2 | 11/1996 |
| EP | 0919906 A2 | 11/1998 |
| EP | 1331762 | 7/2003 |
| EP | 1372333 A2 | 12/2003 |
| EP | 1622378 A1 | 2/2006 |
| EP | 1 761 048 A2 | 3/2007 |
| EP | 1853013 | 11/2007 |
| EP | 1860852 A1 | 11/2007 |
| EP | 1912175 A1 | 4/2008 |
| EP | 1940156 A2 | 7/2008 |
| EP | 2110796 A2 | 10/2009 |
| EP | 2353296 | 8/2011 |
| GB | 2410868 A | 8/2005 |
| GB | 2463108 | 3/2010 |
| GB | 2463110 | 3/2010 |
| GB | 2463124 | 3/2010 |
| GB | 2463108 | 8/2012 |
| JP | 2001169368 | 6/2001 |
| JP | 2004080289 | 3/2004 |
| JP | 2004312320 | 11/2004 |
| JP | 2007067979 | 8/2005 |
| JP | 2008182463 | 8/2008 |
| WO | WO 98/51079 A1 | 11/1998 |
| WO | WO 01/30070 A1 | 4/2001 |
| WO | WO 01/47210 A2 | 6/2001 |
| WO | WO 01/67315 A1 | 9/2001 |
| WO | WO 02/30105 A1 | 4/2002 |
| WO | WO 02/30116 A1 | 4/2002 |
| WO | WO 02/082343 A1 | 10/2002 |
| WO | WO-02082343 | 10/2002 |
| WO | WO 03/021960 A1 | 3/2003 |
| WO | WO 03/028373 A1 | 4/2003 |
| WO | WO 2005/009019 A2 | 1/2005 |
| WO | WO 2005/025194 A1 | 3/2005 |
| WO | WO 2007/098155 A2 | 8/2007 |
| WO | WO 2007/113580 A1 | 10/2007 |
| WO | WO 2007/127788 A2 | 11/2007 |
| WO | WO 2008/030711 A2 | 3/2008 |
| WO | WO 2009/094291 A1 | 7/2009 |
| WO | WO-2010026185 | 3/2010 |
| WO | WO-2010026187 | 3/2010 |
| WO | WO-2010026190 | 3/2010 |
| WO | WO-2010026191 | 3/2010 |

OTHER PUBLICATIONS

Notification of Transmittal of the International Search Report and the Written Opinion of the International Searching Authority, or the Declaration, for International Application No. PCT/EP2009/061413, dated Apr. 12, 2009, consisting of 13 pages.

"Advisory Action", U.S. Appl. No. 12/455,084, (Mar. 21, 2012), 3 pages.

"Advisory Action", U.S. Appl. No. 12/455,210, (Jun. 5, 2012), 2 pages.

"Advisory Action", U.S. Appl. No. 12/455,653, (Nov. 21, 2011), 3 pages.

"Advisory Action", U.S. Appl. No. 12/584,463, (May 17, 2012), 3 pages.

"Final Office Action", U.S. Appl. No. 12/455,084, (Jan. 17, 2012), 16 pages.

"Final Office Action", U.S. Appl. No. 12/455,210, (Mar. 19, 2012), 14 pages.

"Final Office Action", U.S. Appl. No. 12/455,652, (May 16, 2012), 30 pages.

"Final Office Action", U.S. Appl. No. 12/455,653, (Sep. 14, 2011), 30 pages.

"Final Office Action", U.S. Appl. No. 12/584,463, (Feb. 24, 2012), 12 pages.

"Foreign Office Action", Great Britain Application No. 0907818.9, (Mar. 14, 2012), 4 pages.

"International Search Report and Written Opinion", Application No. PCT/EP2009/061418, (Apr. 12, 2009), 13 pages.

"International Search Report and Written Opinion", Application No. PCT/EP2009/061410, (Oct. 20, 2009), 14 pages.

"International Search Report and Written Opinion", Application No. PCT/EP2009/061409, (Oct. 20, 2009), 15 pages.

"International Search Report and Written Opinion", Application No. PCT/EP2009/061411, (Nov. 26, 2009), 20 pages.

"International Search Report and Written Opinion", Application No. PCT/EP2009/061416, (Oct. 21, 2009), 13 pages.

"International Search Report and Written Opinion", Application No. PCT/EP2009/061398, (Oct. 20, 2009), 15 pages.

"International Search Report", Application No. PCT/EP2009/061406, (Dec. 4, 2009), 3 pages.

"International Search Report", GB Application 0907818.9, (Aug. 24, 2009), 1 pages.

"Non Final Office Action", U.S. Appl. No. 12/455,653, (Mar. 23, 2011), 22 pages.

"Non-Final Office Action", U.S. Appl. No. 12/455,084, (May 23, 2011), 14 pages.

"Non-Final Office Action", U.S. Appl. No. 12/455,210, (Sep. 29, 2011), 14 pages.

"Non-Final Office Action", U.S. Appl. No. 12/455,652, (Jan. 26, 2012), 28 pages.

"Non-Final Office Action", U.S. Appl. No. 12/584,463, (Oct. 13, 2011), 10 pages.

"Search Report", Application No. GB0816279.4, (Nov. 26, 2009), 2 pages.

"Search Report", Application No. GB0816276.0, (Nov. 27, 2009), 2 pages.

"Search Report", Application No. GB0816278.6, (Dec. 2, 2009), 2 pages.

"Search Report", Application No. GB0816280.2, (Dec. 3, 2009), 1 page.

"Search Report", Application No. GB0816281.0, (Nov. 20, 2009), 2 pages.

"Search Report", Application No. GB0816271.1, (Nov. 24, 2009), 2 pages.

"Search Report", Application No. GB0816275.2, (Nov. 23, 2009), 1 page.

"Written Opinion of the International Searching Authority", Application No. PCT/EP2009/061406, (Dec. 4, 2009), 5 pages.

"Advisory Action", U.S. Appl. No. 12/455,652, (Aug. 30, 2012), 3 pages.

"Non-Final Office Action", U.S. Appl. No. 12/455,084, (Aug. 30, 2012), 29 pages.

"Non-Final Office Action", U.S. Appl. No. 12/455,635, (Aug. 22, 2012), 20 pages.

"Non-Final Office Action", U.S. Appl. No. 12/455,653, (Oct. 23, 2012), 28 pages.

"Non-Final Office Action", U.S. Appl. No. 12/583,007, (Aug. 8, 2012), 6 pages.

"Non-Final Office Action", U.S. Appl. No. 12/584,463, (Aug. 3, 2012), 11 pages.

"Notice of Allowance", U.S. Appl. No. 12/455,210, (Oct. 10, 2012), 4 pages.

"Corrected Notice of Allowance", U.S. Appl. No. 12/455,210, (Dec. 5, 2012), 2 pages.

"Examination Report", EP Application No. 0816280.2, (Feb. 29, 2012), 4 pages.

"Examination Report", GB Application No. 0816281.0, (Sep. 13, 2012), 2 pages.

"Final Office Action", U.S. Appl. No. 12/455,635, (Dec. 31, 2012), 25 pages.

"Foreign Office Action", Great Britain Application No. 0816279.4, (Mar. 8, 2012), 5 pages.

"Notice of Allowance", U.S. Appl. No. 12/583,007, (Nov. 29, 2012), 4 pages.

"Notice of Allowance", U.S. Appl. No. 12/584,463, (Nov. 16, 2012), 7 pages.

"Corrected Notice of Allowance", U.S. Appl. No. 12/455,084, (Apr. 15, 2013), 2 pages.

"Corrected Notice of Allowance", U.S. Appl. No. 12/455,653, (Apr. 19, 2013), 4 Pages.

"Corrected Notice of Allowance", U.S. Appl. No. 12/583,007, (Feb. 14, 2013), 2 pages.

"Corrected Notice of Allowance", U.S. Appl. No. 12/583,007, (Mar. 21, 2013), 2 pages.

"Notice of Allowance", U.S. Appl. No. 12/455,084, (Feb. 11, 2013), 4 Pages.

"Notice of Allowance", U.S. Appl. No. 12/455,653, (Mar. 6, 2013), 9 pages.

"Non-Final Office Action", U.S. Appl. No. 12/455,635, (Jun. 17, 2013), 25 pages.

"Supplemental Notice of Allowance", U.S. Appl. No. 12/455,084, (May 29, 2013), 2 pages.

* cited by examiner

COMMUNICATION SYSTEM AND METHOD

RELATED APPLICATION

This application claims priority under 35 U.S.C. §119 or 365 to Great Britain Application No. 0816281.0, filed Sep. 5, 2008. The entire teachings of the above application are incorporated herein by reference.

FIELD OF THE INVENTION

The present invention relates to bidirectional video communications over a packet-based communications network.

BACKGROUND

Packet-based communication systems allow the user of a device, such as a personal computer, to communicate across a computer network such as the Internet. Packet-based communication systems include video over internet protocol (IP) communication systems, which allow users to exchange live video streams over the Internet. These systems are beneficial to the user as they are often of significantly lower cost than fixed line or mobile networks. This may particularly be the case for long-distance communication. To use a video-over-IP system, the user must install and execute client software on their device. The client software provides the video IP connections as well as other functions such as registration and authentication. In addition to video communication, the client may also provide further features such as audio, instant messaging ("IM"), SMS messaging, and voicemail.

One type of packet-based communication system uses a peer-to-peer ("P2P") topology built on proprietary protocols. To enable access to a peer-to-peer system, the user must execute P2P client software provided by a P2P software provider on their computer, and register with the P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through the P2P system based on the exchange of one or more digital certificates (or user identity certificates, "UIC"), which enable access to the P2P system. The exchange of the digital certificates between users provides proof of the users' identities and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a P2P system are disclosed in WO 2005/009019.

Users are thus able to make face-to-face video calls, by exchanging video images taken from a web-cam mounted on each of their respective computer terminals.

However, there is still a problem with such video calls in that the degree of interaction between users is limited. When meeting in person, information is not only communicated by voice, facial expression and gesticulation: some information is also added by the context of a shared experience, situation or surroundings. When communicating remotely via a video call, this context may be lost and so communications may be more cumbersome or confused.

SUMMARY

According to one aspect of the present invention, there is provided a method of transmitting video data, the method comprising: establishing a bidirectional video channel between a first terminal and a second terminal in a packet-based communication network; beginning a live, face-to-face video call over the established channel by generating first video data from a video camera of the first terminal, transmitting the first video data to the second terminal for display on a screen of the second terminal, receiving second video data generated from a video camera of the second terminal, and displaying the second video data on a screen of the first terminal; generating third video data at the first terminal from a source other than said video camera of the first terminal; receiving a user selection at the first terminal; and in response to the user selection, transmitting the third video data to the second user over said established channel of the packet-based communication network for display on the screen of the second terminal.

By adding video content to the call from sources such as a TV stream, camcorder, video disc player or such like, the user is able to better share their ideas with another user and thus facilitate communications between the two.

In a preferred embodiment, said source may comprise a television receiver of the first terminal and a signal processing apparatus of the first terminal, and the generation of the third video data may comprise receiving a broadcast television signal using said television receiver and operating said signal processing apparatus to process the received television signal for transmission over the packet-based communication network.

For example, the first terminal may be a television set, or the first terminal may be a set-top box for connection to a television set.

In embodiments, said source may comprises an auxiliary input of the first terminal for connection to an external video playback device, and a signal processing apparatus of the first terminal; and the generation of the third video data may comprise receiving an auxiliary video signal via the auxiliary input and operating said signal processing apparatus to process the auxiliary video signal for transmission over the packet-based communication network.

According to another aspect of the invention, there is provided a first terminal comprising: a first video camera for supplying first video data; an alternative video source operable to supply third video data; a memory storing a communication client application; processing apparatus, coupled to said memory, video signal source and first video camera, operable to execute the communication client application; and a user input device communicable with the processing apparatus; wherein the client application is programmed so as when executed to allow a user of the first terminal to establish a bidirectional video channel with a second terminal over a packet-based communication network, and thereby begin a live, face-to-face video call over the established channel by transmitting the first video data from the first video camera to the second terminal for display on a screen of the second terminal, receiving second video data generated from a second video camera of the second terminal, and displaying the second video data on a screen of the first terminal; wherein the client application is further programmed to receive a user selection from the user input device, and in response to the user selection to transmit the third video data from the third video source to the second user over said established channel of the packet-based communication network for display on the screen of the second terminal.

According to another aspect of the present invention, there is provided communication system comprising a first terminal and a second terminal connected to a packet-based communication network, wherein: the first terminal comprises a memory storing a first communication client application, first processing apparatus arranged to execute the first communication client application, a first video camera coupled to the first processing apparatus, an alternative video source coupled to the first processing apparatus, and a user input device communicable with the first processing apparatus; the second terminal comprises a second memory storing a second communication client application, second processing apparatus arranged to execute the second communication client application, and a second video camera coupled to the second processing apparatus; wherein said first and second client applications are programmed so as when executed to allow a bidirectional video channel to be established between the first terminal and the second terminal over the packet-based communication network, and thereby begin a live, face-to-face video call over the established channel by generating first video data from the first video camera of the first terminal, transmitting the first video data to the second terminal, displaying the first video data on a screen of the second terminal, generating second video data from the second video camera of the second terminal, transmitting the second video data to the first terminal, and displaying the second video data on a screen of the first terminal; and the first client application is further programmed to generate third video data at the first terminal from said alternative source, receive a user selection at from said user input device, and in response to the user selection to transmit the third video data to the second terminal over said established channel of the packet-based communication network for display on the screen of the second terminal.

According to another aspect of the present invention, there is provided a communication client application product.

DETAILED DESCRIPTION OF PREFERRED EMBODIMENTS

Figure 1:
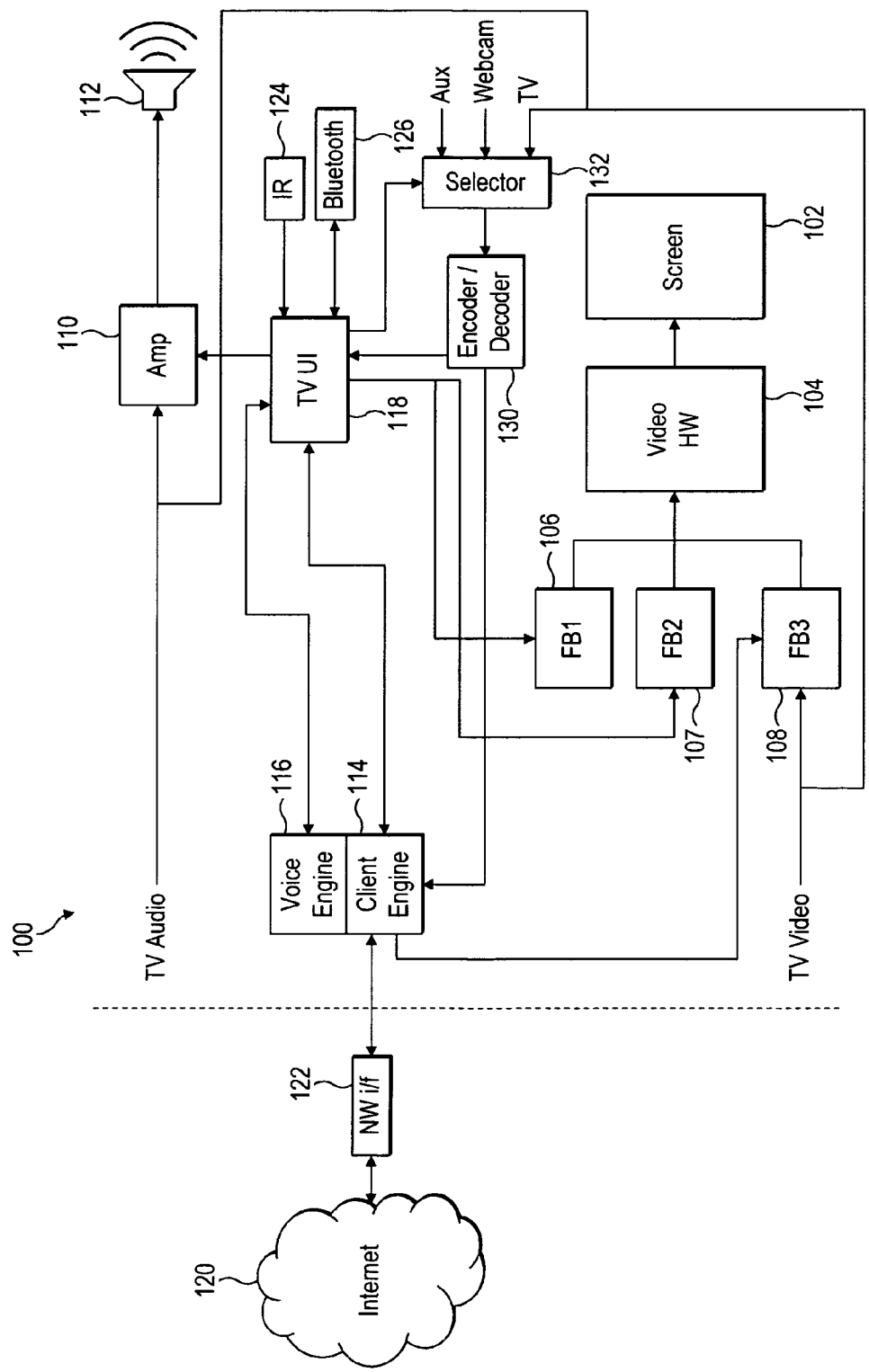
FIG. 1 is a block diagram showing the functional blocks of a TV with an embedded communication client.

In embodiments, a user of one terminal of a packet-based video communication system may insert alternative video into a face-to-face video call over a bidirectional video channel established with the respective terminal(s) of one or more other users of the packet-based communication system. The terminal of any of the users could be a personal computer, mobile phone, personal digital assistant (PDA) or such like, but in a preferred embodiment at least one of the terminals is a television set or a set-top box having a memory storing a communication client for the packet-based video communication system and a central processing unit (CPU) arranged to execute the client, thus allowing bidirectional, packet-based video communications to be accessed using a television over a packet-based communication system such as a P2P system implemented via a packet-based communication network such as the Internet.

One problem with packet-based communication networks is that the accessibility of packet-based communications to users is limited. In particular, such communications are most commonly accessed using a personal computer. This can be a disadvantage for some users in that they must be sufficiently technically competent to download and install the packet-based communication client software on their personal computer, which provides a barrier to the take-up of the packet-based communication service. Even when the communication client is installed and executed on a personal computer, the use of the packet-based communication system may be limited because personal computers are often not located in a place where the user is either familiar or comfortable with communicating. For example, a personal computer is often located in a study which for many users is not the most natural or comfortable environment for making phone calls.

Whilst packet-based communication systems can also be accessed via certain mobile devices, these generally do not have processing resources or display screens available to offer a full range of features, such as video calling.

It would therefore be desirable to make packet-based communications more accessible to users. To achieve this, a system has been developed to enable a user to access such networks from a television ("TV"). This is achieved either by embedding the communication client into the TV itself, or into a separate set-top box ("STB") television receiver connected to the TV. The client application is in the form of software stored in a memory and arranged for execution on a central processing unit (CPU), the memory and CPU being integrated together with a television receiver (and screen in the case of a TV) into a single household appliance, and hence sold together as a single product, in a single casing preferably with remote control. The TV or STB product is preferably a dedicated TV receiver system, in that its default mode of operation is as a television or television receiver.

This arrangement is advantageous because the TV can be provided with all the embedded hardware and software required to access the packet-based communication system built-in. Alternatively, this can be embedded into a STB which is readily connected to an existing TV using known interfaces (such as SCART or HDMI, for example). This eliminates the need for the user to download and install software on their personal computer, and provides a simpler method by which non-technical users can access the packet-based communication system in their home. In addition, the TV is typically located in a living room of a house, which enables the packet-based communication system to be accessed from the location in the house which is most familiar to many users for communicating with friends and relatives.

The embedding of a packet-based communication client in a TV also has the advantage that a large screen is present, which can be utilised for video calling. Furthermore, significant processing power can be provided in the TV, particularly as the power requirements for a large, mains electricity powered consumer electronics device are less stringent than, for example mobile devices. This enables a full range of features to be included in the embedded communication client, such as high quality voice and video encoding.

Furthermore, according to a particularly preferred embodiment of the present invention, incorporating a video-over-IP client into the TV provides a unique opportunity: during a live video call, the client may be programmed such that a user can transmit video data provided from a data source connected to the TV, either as an alternative to or in addition to their local outgoing video provided from the webcam. By default a webcam for face-to-face communications is set, but additionally:

the user may transmit their received TV stream to the remote party, or the user may alternatively or additionally transmit data input from an auxiliary audio-video connection (e.g. provided from a camcorder or DVD player) to the remote party.

Thus a user may advantageously choose to transmit alternative or additional video streams during a video call set up between two or more users.

Reference is now made to FIG. 1, which illustrates the hardware and software functional blocks embedded in a TV 100. The TV 100 comprises a screen 102 for displaying images to the user, which is driven by video driver hardware 104 arranged to convert the video signals into the form required to be correctly displayed on the screen 102. The video driver hardware 104 is provided with digital video data from two frame buffers 106 and 108. The frame buffers 106 and 108 are storage devices that buffer video data that is to be displayed to the user. Frame buffer 3 ("FB3") 108 receives standard TV video signals, as is known for the display of broadcast TV. Frame buffer 1 ("FB1") 106 stores video data related to the packet-based communication client, as will be described presently. An audio amplifier 110 receives TV audio signals and amplifies these for output through at least one speaker 112.

The TV audio and video input signals themselves originate from television signals broadcast via any suitable means such as a satellite repeater stations, wireless terrestrial repeater stations or cable; and are received by a television receiver unit of the TV 100 (not shown). Note that broadcasting is distinct from point-to-point communication, including being distinct from multicasting (i.e. point-to-multipoint). In broadcasting, signals are transmitted indiscriminately, i.e. regardless of whether the user has selected to receive the signal (although a decryption key or such like may still be required so that only authorised users can access the broadcast); whereas in point-to-point communication, signals must be requested by the user or users receiving them. Or put another way, to receive a broadcast a user simply "tunes in" without needing to send any signal to the broadcaster, whereas to establish a point-to-point connection then signals must be exchanged between the user and broadcaster.

The TV receiver unit may comprise for example an antenna, satellite dish or cable input; sampling circuitry; a filter; a low noise amplifier; a mixer, and/or an analogue to digital converter.

After being received by the receiver unit, the signals are then processed by a signal processing apparatus (also not shown) before being input to the frame buffers and amplifier of FIG. 1. The signal processing may comprise for example a digital filter, demultiplexer, decoder, decryption block, and/or error checking block; which may be implemented in on-chip hardware in the form of one or more on-chip peripherals, off-chip hardware in the form of one or more off-chip units accessed via one or more I/O peripherals, or in software stored in a memory and executed on a central processing unit (CPU) of the television 100, or in any combination of these.

In the case of traditional analogue television broadcasts, the signals of a plurality of different concurrent programs (of different TV channels) are frequency-division multiplexed over the airwaves by being transmitted on different frequencies. The receiving TV then requires a tuning circuit to demultiplex the broadcasts to separate out signal of the required program. In the case of digital television broadcasts, the signals of different concurrent programs are each divided into packets and interleaved so as to time-division multiplex the different programs' signals into a transport stream for broadcast. The receiving TV then requires a packet filter to demultiplex the packets and so separate out the signal of the required program.

In a preferred embodiment, the TV 100 receives and processes a TV stream, including the possibility of a live TV stream. The fact that the TV signal is in the form of a stream means the packets of that stream have a certain sequential order and real-time requirement relating to their information content. Although a stream may be stored for later consumption, and/or its order or timing requirements need not necessarily be maintained during processing prior to consumption, when the stream is ultimately output to the user for consumption then the order and real-time requirements must be respected (at least on a practical level to a degree that is unnoticeable or tolerable to the user). Further, the fact that the stream is "live" means it is of a currently ongoing broadcast (although not necessarily that the broadcast is being filmed live at its source).

Note: the transport packets of the TV stream are different from the packets of the packed-based communications implemented by the client, which would typically be IP packets; and the television network is separate from the packet-based communication network 120 accessed using the client. The TV network broadcasts in one direction from a central source, via repeater stations, to a plurality of users; whereas the packet-based communication network 120 allows bidirectional communications to be established between end-users. Further, the TV network is hierarchical, whereas the packet-based communication network 120 is preferably non-hierarchical, especially in the case of a P2P network.

The packet-based communication client embedded in the TV 100 is based around three main elements. Preferably, these three elements are software elements that are stored in memory and executed on a CPU embedded in the TV 100. The three elements are: a client engine 114; a voice engine 116; and a TV user interface (UI) 118. An electronic program guide (EPG) may also be implemented in software, providing a schedule of television programs.

The client engine 114 and voice engine 116 establish and conduct bidirectional, packet-based, point-to-point (including the possibility of point-to-multipoint) video communications via a packet based communication network such as the Internet; e.g. by establishing a peer-to-peer (P2P) connection over a peer-to-peer network implemented over the Internet 120.

The client engine 114 is responsible for setting up connections to the packet-based communication system, and thus establishing a video channel with a terminal of another user over the packet-based communication system. This is performed via a connection from the TV 100 to the internet 120. The TV 100 is connected to the internet 120 via a network interface 122 such as a modem, and the connection between the TV 100 and the network interface 122 may be via a wired connection or a wireless connection. The client engine 114 performs call set-up, authentication, encryption and connection management, as well as other functions relating to the packet-based communication system such as firewall traversal, presence state updating, and contact list management.

The voice engine 116 is responsible for encoding of voice signals input to the TV 100 as VoIP packet for transmission over the internet 120 and the decoding of VoIP packets received from the internet 120 for presentation as audio information to the user of the TV 100. The TV user interface ("UI") 118 is responsible for presenting visual information to the user of the TV 100 in the form of a graphical user interface displayed on the TV screen 102.

The client engine 114 is connected to the TV UI 118 in order to control what the UI displays to the user. The client engine 114 is also closely integrated with the voice engine 116 for the efficient transmission and receiving of voice packets over the internet.

The voice engine 116 is connected to the TV UI 118 as voice signals from the user are passed through the TV UI 118 to the voice engine 116, and vice versa.

The TV UI 118 is connected to a frame buffer 1 ("FB1") 106, so that the graphical user interface data is buffered and ultimately displayed to the user on the screen 102. The TV UI 118 is also connected to the amplifier 110, enabling sound (such as voice signals or notifications) to be produced from the TV speakers 112. The TV UI 118 is also connected to an infra-red ("IR") receiver 124 and a Bluetooth transceiver 126 which are used for communicating with a remote control unit, as will be discussed below Further, the TV 100 may comprise an encoder/decoder block 130 connected to receive the TV video and audio inputs. The encoder/decoder block also has input an connection for connecting to a webcam, and one or more other auxiliary inputs for connecting to another auxiliary device such as a camcorder, video disc player, personal video recorder (PVR), etc. The webcam could alternatively be built in to the same device as the TV 100 or STB. The encoder/decoder block 130 is coupled to the TV UI 118 and the client engine 114, and is configured to perform trans-coding of video and audio signals by decoding a signal from its incoming codec and re-encoding according to another codec for output to a different type of device than that from which it was input (or alternatively a direct trans-coder could be used). So the encoder/decoder block 130 will decode the TV signal from the codec used for output to the TV screen and re-encode it into a codec suitable for video-over-IP transmission over the internet 120, via the client engine 114. The encoder/decoder block 130 may also decode the webcam signal or the auxiliary signal and re-encode it for output to the TV screen 102 via the TV UI 118 or re-encode it for video-over-IP transmission over the internet 120 via the client engine 114. Advantageously, the encoder/decoder 130 therefore allows TV signals received via a TV receiver of the TV set 100 to be transmitted to another user over the internet 120 using the packet-based video-over-IP communication system, either in place of or conjunction with the webcam video signals used for face-to-face video calls. Similarly, the encoder/decoder 130 advantageously allows video from auxiliary inputs such as from a camcorder, PVR, DVD player or other video disc player to be output to the TV screen 102 and/or to be transmitted to another user over the internet 120 using the packet-based video-over-IP communication system, either in place of or conjunction with the webcam video signals used for face-to-face video calls.

The encoder/decoder block 130 is connected to the TV, webcam and auxiliary inputs via a selector 132 configured to allow the user to select between either the TV, webcam or auxiliary input for supply to the client engine 114 and thus for transmission to the other user over the video-over-IP system. The selector 132 may also be configured to allow the user to select a combination of TV, webcam and/or auxiliary input for transmission to the other user over the video-over-IP system. The selector 132 may also be configured to allow the user to select between the TV, webcam or auxiliary input, or a combination of them, for display on the screen 102 by sending appropriate signals to the TV UI 118.

The encoder/decoder block 130 may be implemented in one or more dedicated hardware units, or in software stored on a memory and executed on a CPU of the TV 100.

The TV UI 118 may also be connected to one or more additional frame buffers ("FB2") 107, where video signals that are to be transmitted over the video-over-IP system are also output for display locally in a smaller "preview window" on the screen 102. This will be described later with reference to FIG. 4.

Known TVs are not designed to accommodate any form of bidirectional communications. A system is therefore required for enabling user interaction with the TV for making and receiving calls and messages which is intuitive for users. To achieve this, the remote control of the TV is preferably enhanced to provide functionality which enables the user to make and receive calls, as well as send and receive messages using the TV.

Figure 2:
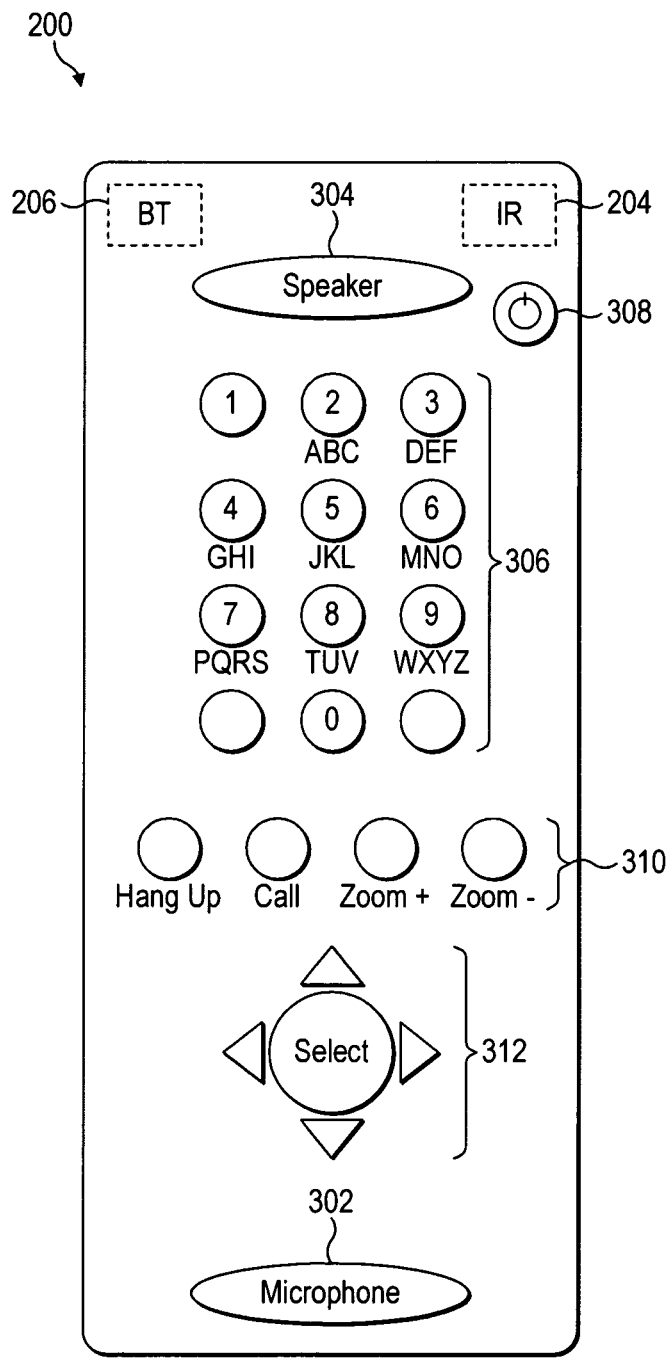
FIG. 2 shows a remote control of a remote control unit for use with the TV of FIG. 1.

Reference is now made to FIG. 2, which illustrates an example of the physical layout of a remote control unit 200 for use with the TV 100. The remote control unit 200 resembles conventional remote controls for TVs. However, the remote control unit 200 includes an integrated microphone 302, and, optionally an integrated speaker 304. This enables the remote control unit 200 to be held to the head of the user in a similar manner to a conventional telephone. Integrated within the unit are an IR transmitter 204 and Bluetooth transceiver 206. The IR transmitter 204 sends IR signals to the IR receiver 124 in the TV 100, allowing the user to change channels, turn the television on or off, or select alternative auxiliary inputs such as in input from a DVD player or other video disc system. This is performed in a similar manner to conventional remote control units used with televisions. Bluetooth transceiver 206 which is able to communicate with the Bluetooth transceiver 126 located in the TV 100. The Bluetooth transceiver 206 is paired with the Bluetooth transceiver 126 located in the TV 100 such that a data connection can be readily formed between them. The data connection enables the transmission of data from the remote control unit 200 to the TV 100, and, optionally, the reception of data from the TV 100 at the remote control unit 200. This allows audio data to be communicated with the client and voice engine 114 and 116 for use in the bidirectional, packet-based communications with other users over the Internet 120.

The remote control unit 200 further comprises a keypad 306, which is used for conventional TV control purposes, and also for entering information for the embedded packet-based communication client. The keypad 306 comprises numbered keys that can also be used to enter alphabetic characters. A standby button 308 is used for placing the TV 100 into standby mode. Dedicated function keys 310 are used to control the operation of the packet-based communication client, and a directional pad 312 is used for navigating the TV user interface.

Figure 3:
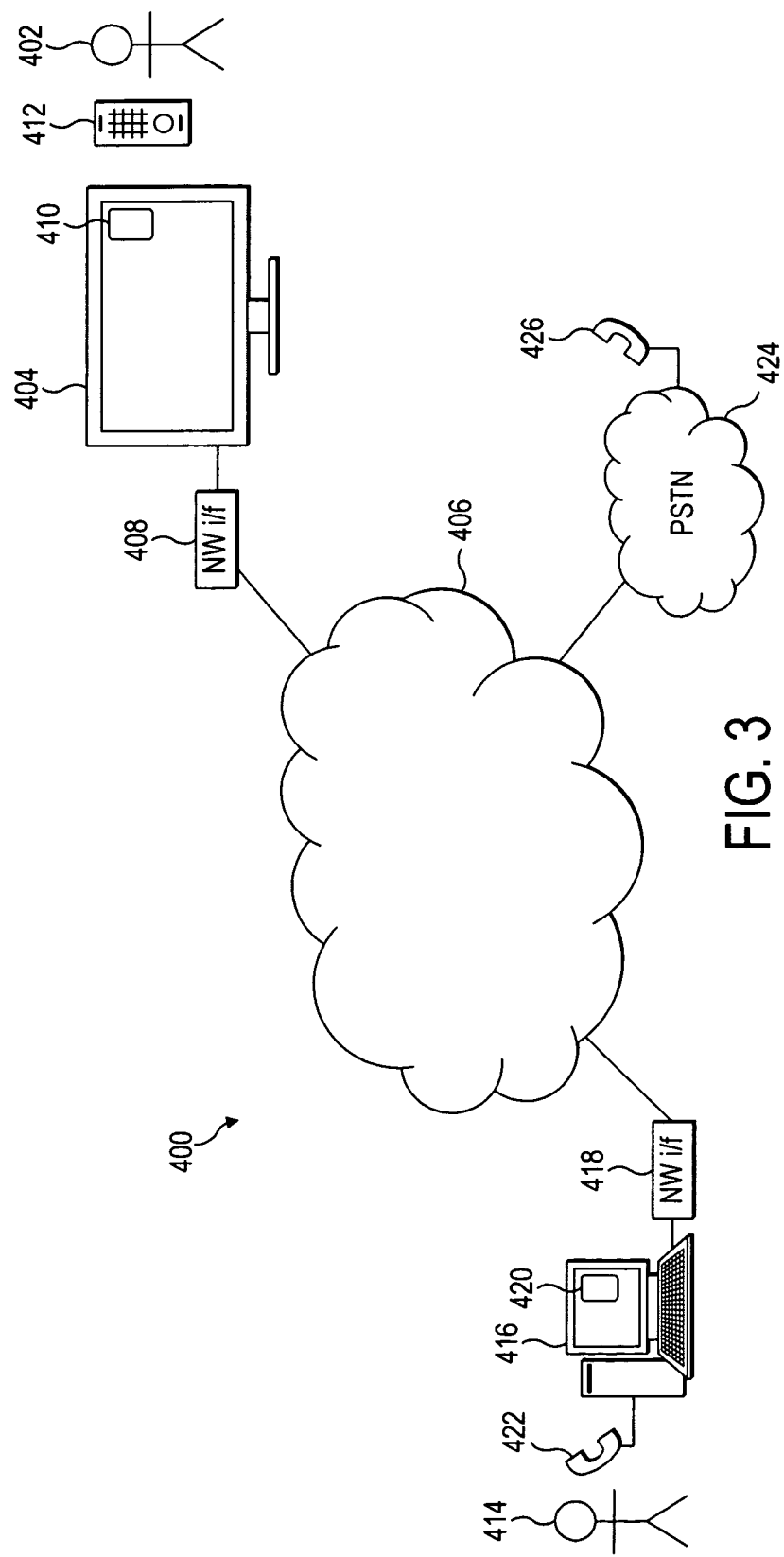
FIG. 3 shows an illustrative packet-based communication system.

In order to describe the operation of the TV 100 and enhanced remote control unit 200 with the packet based communication system, reference is now made to FIG. 3, which illustrates the use of the TV 100 in a portion of an example system 400.

Note that whilst the illustrative embodiment shown in FIG. 3 is described with reference to a P2P communication system, other types of communication system could also be used, such as non-P2P, video-over-IP or IM systems. The system 400 shown in FIG. 3 shows a first user 402 of the communication system operating a TV 404 (similar to the TV 100 of FIG. 1) which is shown connected to a network 406. Note that the communication system 400 utilises a network such as the Internet. The TV 404 is connected to the network 406 via a network interface 408 such as a modem, and the connection between the user terminal 104 and the network interface 108 may be via a cable (wired) connection or a wireless connection. The TV 404 shown in FIG. 3 is a standalone unit, but it should be appreciated that a separate TV and STB can also be used.

The TV 404 is executing an embedded communication client 410. Note that in alternative embodiments, the embedded communication client can be executed in a set top box. The embedded communication client 410 comprises software stored in a memory and executed on a local processor in the TV 404.

The TV 404 is arranged to receive information from and output information to the user 402. A remote control unit 412 acts as the input device operated by the user 402 for the control of the TV 404. The remote control 412 comprises a speaker and microphone to enable the user to listen and speak in a voice or video call. The remote control unit 412 communicates wirelessly with the TV 404, as described previously.

The TV 404 can also receive broadcast television signals, and display these as video (television programmes) to the user on the TV screen. The broadcast television signals can be delivered by terrestrial, satellite or cable broadcasting, and be in the form of analogue signals or digital data. The user 402 can control the display of the television signals (e.g. which channels to display) using the remote control unit 412. The TV 404 can also receive one or more audio-video inputs via auxiliary inputs from alternative sources such as from a DVD player or other video disc system, which again can be selected by the user 402 using the remote control unit 412.

The embedded communication client is arranged to establish and manage calls made over the packet-based communication system using the network 406. The embedded communication client 410 is also arranged to present information to the user 402 on the screen of the TV 404 in the form of a user interface. The user interface comprises a list of contacts associated with the user 402. Each contact in the contact list has a presence status chosen by the contact associated with it, and each of these contacts have authorised the user 402 of the client 410 to view their contact details and contact-defined presence state. The presence state tells other authorised users (e.g. 414) of the packet-based communication network 400 about the user-defined availability of the user 402.

The contact list for the users of the packet-based communication system is stored in a contact server (not shown in FIG. 3). When the client 410 first logs into the communication system the contact server is contacted, and the contact list is downloaded to the client 410. This allows the user to log into the communication system from any terminal and still access the same contact list. The contact server is also used to store a mood message (a short user-defined text-based status that is shared with all users in the contact list); and a picture selected to represent the user, which may be referred to as an "avatar". This information can be downloaded to the client 410, and allows this information to be consistent for the user when logging on from different terminals. The client 410 also periodically communicates with the contact server in order to obtain any changes to the information on the contacts in the contact list, including the avatar, or to update the stored contact list with any new contacts that have been added.

Also connected to the network 406 is a second user 414. In the illustrative example shown in FIG. 3, the user 404 is operating a user terminal 416 in the form of a personal computer. Note that in alternative embodiments, other types of user terminal can also be connected to the packet-based communication system. In addition to personal computers ("PC") (including, for example, Windows™, Mac OS™ and Linux™ PCs), a personal digital assistant ("PDA"), a mobile phone, or a gaming device could also be connected. In a preferred embodiment of the invention the user terminal 416 comprises a display such as a screen and an input device such as a keyboard, mouse, joystick and/or touch-screen. The user device 416 is connected to the network 406 via a network interface 418 such as a modem.

Note that in alternative embodiments, the user terminal 416 can connect to the communication network 406 via additional intermediate networks not shown in FIG. 1. For example, if the user terminal 416 is a mobile device, then it can connect to the communication network 406 via a mobile network (for example a GSM or UMTS network).

The user terminal 416 is running a communication client 420, provided by the software provider. The communication client 420 is a software program executed on a local processor in the user terminal 416 comprising similar elements to the embedded communication client 410. The communication client 420 enables the user terminal 416 to connect to the packet-based communication system. The user terminal 416 is also connected to a handset 422, which comprises a speaker and microphone to enable the user to listen and speak in a voice or video call. The microphone and speaker does not necessarily have to be in the form of a traditional telephone handset, but can be in the form of a headphone or earphone with an integrated microphone, as a separate loudspeaker and microphone independently connected to the user terminal 416, or integrated into the user terminal 416 itself.

To be listed as a contact, a user must have been authorised. This preferably involves one user 402 sending a request to the client 420 of another user 414, and that other user 414 selecting an option to agree to the request (or vice versa), thus indicating that the requesting user is indeed recognised as a friend or associate that the other user would wish to communicate with.

Thus, presuming that the first user 402 is an authorised contact of the second user, the first user will be listed in the contact list of the client 420 presented to second user 414. The second user 414 can then initiate a call to the first user 402 over the communication system by selecting the contact and clicking on a "call" button using a pointing device such as a mouse. The call set-up is performed using proprietary protocols, and the route over the network 406 between the calling user and called user is determined by the peer-to-peer system without the use of servers.

Following authentication through the presentation of digital certificates (to prove that the users are genuine subscribers of the communication system—described in more detail in WO 2005/009019), the call can be established.

Referring again to FIGS. 1 and 2, when the incoming call is received at the client engine 114 the TV UI 118 is notified of the incoming call. This places the TV UI 118 into an incoming call state, such that key presses from remote are interpreted accordingly. The TV UI 118 may output graphics to the FB1 106 to display a notification of the incoming call on the TV screen 102, such that the user 402 is aware of the incoming call. Alternatively or additionally, the TV UI 118 may generate a ringing sound or other audible signal to notify the user of the incoming call. The notification may only be active for a predetermined time, after which time the notification will fade and the incoming call state will be deactivated.

The user 402 can select to answer the incoming call by pressing a key on the remote control unit 412 or enacting a physical motion such as sliding out a movable microphone unit. In response to the user 402 selecting to answer the incoming call the remote control unit 200 transmits a command to the TV 100 using the IR transmitter 204. This command indicates that the user has selected to accept the call (either by pressing a button or performing an action). The remote control unit 200 then activates the Bluetooth transceiver 206. The Bluetooth transceiver 206 is not activated until it is needed to save battery power consumption. The Bluetooth transceiver 206 establishes a connection with the Bluetooth transceiver 126 in the TV 100. The microphone circuitry 208 is enabled to receive audio inputs.

When the TV UI 118 receives the command transmitted via the IR transmitter 204 at the IR receiver 124, this is interpreted this as a call accept command, since the TV UI 118 is in the incoming call state. Note that in alternative embodiments, the IR sent from the remote 200 command can be omitted, and the establishment of the Bluetooth connection between the TV 100 and the remote 200 can be interpreted as a call accept command instead.

The TV UI 118 outputs an "answer call" command to the client engine 114. In response to the "answer call" message, the client engine 114 establishes the call connection with the communication client 420 of the calling user 414.

When the user 402 talks into the microphone 302 (shown in FIG. 2), the audio signal is converted to digital data by the microphone circuitry and the Bluetooth transceiver 206 to transmit the audio signal to the Bluetooth transceiver 126 of the TV 100. The transmission of the audio can utilise a standard Bluetooth protocol for transmitting audio information.

Upon receiving the audio information at the Bluetooth transceiver 126, the TV UI 118 passes the audio information to the voice engine 116. The voice engine 116 encodes the audio information as packets and passes these to the client engine 114. The client engine 114 also receives video signals from the encoder/decoder block 130 and packetizes it. The client engine 114 transmits the packets to the network 406 via the network interface 408, where they are routed to the communication client 420 running on the user terminal 416 of the second user 414. The client 420 decodes the packets to produce an audio signal that can be heard by the user 414 using the handset 422 and a video signal that can be displayed on the screen of their terminal 416.

Conversely, when the second user 414 talks into handset 422, the client 420 executed on user terminal 416 encodes the audio signals into packets and transmits them across the network 406 to the TV 404. The client 420 also receives and packetizes video signals. The packets are received at the client engine 114 and passed to the voice engine 116 and client engine 114. The voice engine 116 decodes packets to produce audio information. The audio information is passed to the TV UI 118. The client engine 114 decodes packets to produce video signals for output to the screen 102 via frame buffer FB3 (108).

In one embodiment, the audio information is passed from the TV UI 118 to the amplifier 110, such that the voice from the second user 414 is heard from the TV speakers 112. If the TV 100 is currently being used to watch a TV programme, then the audio from the TV programme can be deactivated. Alternatively, the audio from the call can be mixed with the TV programme audio, which can be decreased in volume. In an alternative embodiment, if the remote control unit 200 comprises the optional speaker circuitry 210, as described above with reference to FIG. 2, the audio information from the TV UI 118 can be passed to the Bluetooth transceiver 126 and transmitted to the remote control unit 200 and converted to audible signals by the speaker circuitry. The user can then hear the voice of the second user 414 from the speaker (304 in FIG. 2) in the remote control unit 200.

The remote control unit 200 can also be used for initiating a call to another party. For example, the first user 402 can use the remote control unit 200 to initiate a call to the second user 414. The TV UI 118 has a "call set up" state which can be entered by the user. The call set up state can be entered by the user selecting a calling functionality option using the remote, for example using a dedicated button on the remote or by navigating to an on-screen option using the directional pad (312 in FIG. 2). Alternatively, the call entry state can be entered by performing a physical action on the remote, such sliding out a movable microphone. In response to this a command is sent to the TV 100 which causes the call entry state to be entered. Typically, the call entry state displays a UI to the user comprising the contact list and a contact name/phone number entry field.

The first user 402 can select the second user 414 from the contact list and initiate the call using the remote control unit. As described above for an incoming call, this sends an IR command to the TV 100, activates the Bluetooth transceiver 206 and activates the microphone circuitry 208. The TV UI 118 sends a message to the client engine 114 to initiate the call to the second user 414. This is performed in a similar manner to that described above for a call initiated from the second user 414 to the first user 402. The call can then proceed in the same manner as described previously.

The video-over-IP packets for calls between users (such as 402 and 414) are passed across the network 406 only, and the public switched telephone network ("PSTN") (424) is not involved. Furthermore, in the preferred embodiment of a P2P system, the actual voice and video calls between users of the communication system can be made with no central servers being used. This has the advantages that the network scales easily and maintains a high quality, and the call can be made cost free to the users.

However, in addition, calls can also be made from the embedded communication client 410 using the packet-based communication system to fixed-line or mobile telephones (e.g. 426), by routing the call to the PSTN network 424. Similarly, calls from fixed-line or mobile telephones 426 can be made to the packet-based communication system via the PSTN 424.

In addition to making video calls, the user 402 of the client 410 can also communicate with the users listed in the contact list in several other ways. For example, an instant message (also known as a chat message) can be sent to a contact. As with voice or video calls, the remote control unit 200 can be used for instant messaging. Text data can be input using the number keys, which are also used to enter alphabetic characters. The text data is transmitted to the TV 100 using the IR transmitter 204, as this is more power-efficient than Bluetooth and does not require a high data rate.

The TV UI 118 has a "chat entry state" in which key presses from the remote control unit (received at the IR receiver 124) are interpreted as alphanumeric characters that are passed to the client engine 114. The chat entry state can be entered when a user responds to an incoming chat message, or when the user 402 selects a "chat" option displayed in the UI. The chat message data is encoded and sent from the client engine 114 over the network 406 to the communication client 420 of, for example, the second user 414. The message is displayed to the second user 414 on the user terminal 416. The second user 414 can respond by entering his own chat message, which is sent by the client 420 and received at the client engine 114. The client engine passes the message to the TV UI 118, which displays the message to the user 402 on the screen 102.

The above-described system therefore provides the ability to make and receive calls and IM message on a TV.

With reference to FIGS. 4a-4d, the screen 102 of a user 402 can be used to display the incoming video image from another user 414 in a first, larger portion of the screen 502; and to display the outgoing video image transmitted to the other user 414 in a second, smaller portion of the screen 504 which may be referred to as the preview image. The image in the preview window 504 is a smaller version of what the second user 414 will see on their respective terminal 416.

In FIGS. 4a-4d, the main (i.e. first) screen portion 502 shows the face-to-face video image of the second user 414 as received over the video-over-IP system 400 from the second user's webcam. As discussed above, the first user 402 may select whether to transmit back face-to-face video from their own webcam to the second user 414, or whether to transmit back video from a live TV stream of from an auxiliary input such as from a camcorder, DVD player, PVR, etc. The first user may select to transmit the TV or auxiliary video either instead of or in addition to the face-to-face webcam video. By default a webcam for face-to-face communications is set, but additionally the user 402 may transmit their received TV stream to the remote party 414 or the user may alternatively or additionally transmit data input from the auxiliary connection to the remote party 414.

Referring again to FIG. 1, the selector 132 is coupled to the TV UI 118, such that the selection of TV, webcam or auxiliary or potentially any combination of these may be selected by the user via the remote control unit 200, preferably via the IR interface 124, 204. For example, the selection could be chosen from an on-screen menu using the arrow keys and "select" button 312, or the different options or combinations could be toggled through be repeatedly pressing a dedicated button included on the remote control 200 for this purpose. The TV UI 118 is arranged to output an appropriate selection signal to the selector 132.

Figure 4A:
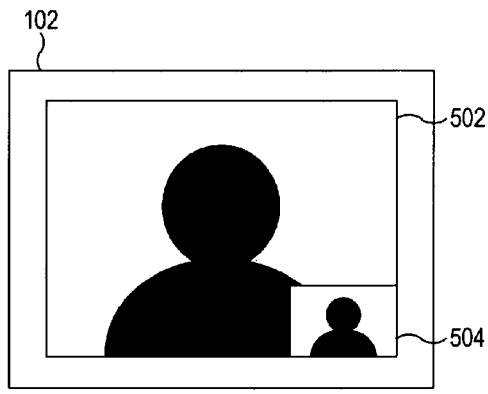
FIGS. 4(a)-4(d) show a series of schematic screen-shots as seen by a user in a bidirectional video call.
Figure 4B:
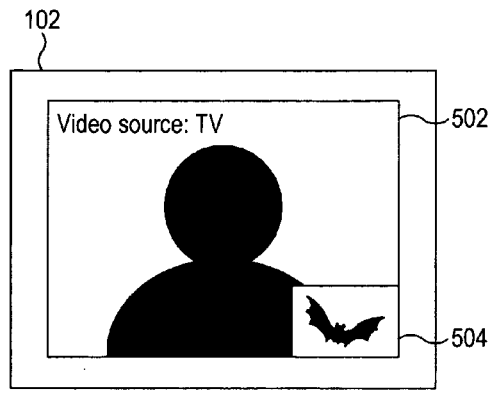
Figure 4C:
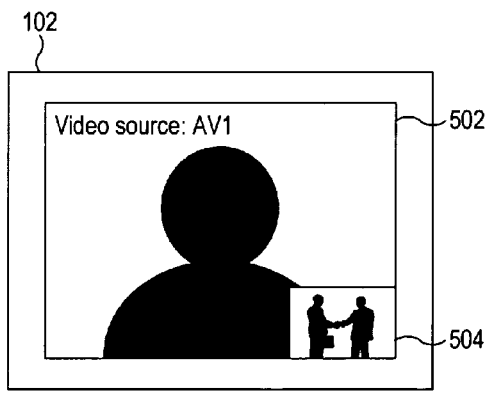
Figure 4D:
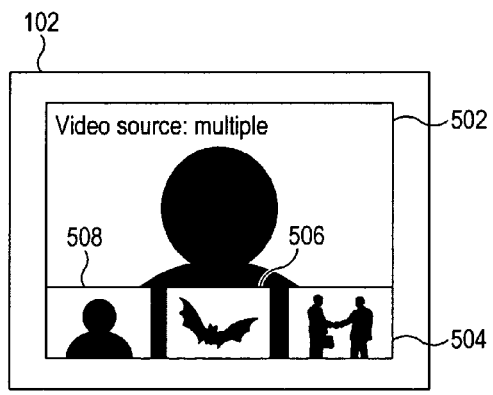

To illustrate some examples of possible selections, the screen 102 as seen by the first user 102 is shown schematically in FIGS. 4a-4d, with the received (incoming) video shown in the main portion 502 and the transmitted (outgoing) video shown in the preview window 504. In FIG. 4a, the first user receives incoming face-to-face video from the webcam of the second user 412 and has selected to transmit outgoing face-to-face video from their own webcam to the second user 412. In FIG. 4b, the first user 402 has instead selected to transmit the outgoing video to the second user 412 from a TV broadcast as received at the TV receiver of the first user's TV 404. This could for example be from a live TV broadcast. In FIG. 4c, the first user 402 has instead selected to transmit the outgoing video to the second user 412 from an auxiliary input of the first user's TV 404. This could for example be a playback from a previously recorded home video stored on a camcorder, or from a DVD player or other video disc player, or from a PVR. In FIG. 4d, the first user has selected all three sources for transmission to the second user 414 (shown here as seen on the first user's own TV 404 in three separate preview windows 504, 506 and 508). The first and/or second user's screen view may also be supplemented with a message informing them of the selected video source.

A user is therefore advantageously able to share other video with another remote user as part of their face-to-face video call, and therefore supplement the information communicated over the video call In embodiments, the encoder decoder block 130 may comprise a first encoder for encoding the video signal from the webcam for transmission over the packet-based communication system, and one or more second encoders for encoding the video signal from the TV receiver or TV's auxiliary input for transmission over the packet-based communication system. If the user selects the option to switch video streams the selector block stops outputting the webcam input to the first encoder and instead outputs the selected video stream to encoder 1. In this case one encoded stream is provided to the client engine 114 to be transmitted to the call participants. If the user selects an option to add alternative video streams the selected block continues to output the webcam data to the first encoder and starts to output the additional video stream (from e.g. TV input or AUX input) to the second encoder. In this case two encoded video streams are provided to the client engine 114 to be transmitted to the call participants.

As mentioned, the transmitted video streams may also be displayed on the transmitting user's TV screen 102 in the preview window 502. Therefore the data encoded by the first encoder may also be provided to frame buffer FB2 under the control of the TV UI 118. The data encoded by the second encoder may also be provided to frame buffer FB2 under the control of the TV UI 118.

Note that the other video is sent as part of the same video call, i.e. same session, as the face-to-face video, whether switched in instead of the face-to-face video or sent together with the face-to-face video. When the client engine 114 establishes a video call, it establishes a bidirectional video channel or connection with one or more other clients 420 of the same packet-based communication system 400. It is over this same channel or connection, between the same clients and using the same packet-based communication system, that both the face-to-face video from the webcams and the other video such as that generated from a live TV stream or auxiliary input are sent. The same call may be identified as such within the system by a unique call or session identifier. The same call or session may be conducted under the same authorisation.

Note also that the video data transmitted from the webcam is live, or real-time, in the sense that it captures and transmits the user's current, ongoing actions (or at least an approximation of such, taking into account that there may be delays in the user's terminal or the network and that the video may be jerky). This is in contrast with the video received via the auxiliary input, which has received from a video playback device where it has been stored, e.g. from a PVR, DVD player or other video disc player, or the storage on a camcorder. The webcam video is also distinguished from the TV signals in that it's source is a camera located at the user terminal, whereas the TV signal is received from a broadcast and then forwarded on from the user's terminal.

While this invention has been particularly shown and described with reference to preferred embodiments, it will be understood to those skilled in the art that various changes in form and detail may be made without departing from the scope of the invention as defined by the appended claims.

The invention claimed is:

1. A method of transmitting video data, the method comprising:
   establishing a bidirectional video channel between a first terminal and a second terminal in a packet-based communication network, wherein the first terminal is configured to be connected to a plurality of alternate sources;
   beginning a live, face-to-face video call over the established channel by generating first video data from a video camera of the first terminal, transmitting the first video data to the second terminal for display on a screen of the second terminal, receiving second video data generated from a video camera of the second terminal, and displaying the second video data on a screen of the first terminal;
   generating third video data at the first terminal from at least one source from the plurality of alternate sources other than said video camera of the first terminal;
   receiving a user selection of one or any combination of the plurality of sources at the first terminal; and in response to the user selection, enabling transmission of, in addition to the first video data, the third video data generated at the first terminal to the second terminal over said established channel of the packet-based communication network for display on the screen of the second terminal.

2. The method according to claim 1, wherein said source comprises a television receiver of the first terminal and a signal processing apparatus of the first terminal, and the generation of the third video data comprises receiving a broadcast television signal using said television receiver and operating said signal processing apparatus to process the received television signal for transmission over the packet-based communication network.

3. The method of claim 1, wherein the first terminal is a television set.

4. The method of claim 1, wherein the first terminal is a set-top box for connection to a television set.

5. The method of claim 3 or 4, wherein said source comprises an auxiliary input of the first terminal for connection to an external video playback device, and a signal processing apparatus of the first terminal; and the generation of the third video data comprises receiving an auxiliary video signal via the auxiliary input and operating said signal processing apparatus to process the auxiliary video signal for transmission over the packet-based communication network.

6. The method of claim 1 further comprising transmitting the third video data over said channel together with the first video data for simultaneous display on the screen of the second terminal.

7. The method of claim 1 further comprising transmitting the third video data over said channel in place of the first video data for display on the screen of the second terminal instead of the first video data.

8. A first terminal comprising:
 a first video camera for supplying first video data;
 an alternative video source operable to supply third video data, the alternate video source being from a plurality of alternate sources other than said first video camera;
 a memory storing a communication client application;
 processing apparatus, coupled to said memory, video signal source and first video camera, operable to execute the communication client application; and
 a user input device communicable with the processing apparatus;
 wherein the client application is programmed so as when executed to allow a user of the first terminal to establish a bidirectional video channel with a second terminal over a packet-based communication network, and thereby begin a live, face-to-face video call over the established channel by transmitting, from the first terminal, the first video data from the first video camera to the second terminal for display on a screen of the second terminal, receiving second video data generated from a second video camera of the second terminal, and displaying the second video data on a screen of the first terminal;
 wherein the client application is further programmed to receive a user selection of one or any combination of the plurality of alternate video sources as the third video source from the user input device, and in response to the user selection, enable transmission of, from the first terminal and in addition to the first video data, the third video data from the third video source to the second terminal over said established channel of the packet-based communication network for display on the screen of the second terminal.

9. The terminal of claim 8, wherein said alternative video source comprises a television receiver operable to receive a broadcast television signal, and a signal processing apparatus operable to process the received television signal for transmission over the packet-based communication network.

10. The terminal of claim 8, wherein the first terminal is a television set.

11. The terminal of claim 8, wherein the first terminal is a set-top box for connection to a television set.

12. The terminal of claim 8, wherein said alternative video source comprises an auxiliary input for connection to an external video playback device and receiving an auxiliary video signal therefrom, and a signal processing apparatus operable to process the auxiliary video signal for transmission over the packet-based communication network.

13. The terminal of claim 8, wherein the client application is further programmed to enable transmission of the third video data over said channel in place of the first video data for display on the screen of the second terminal instead of the first video data.

14. The first terminal of claim 8 further comprising an encoder/decoder block configured to:
 decode a signal from the third video source, the signal from the third video source being in a first encoding format; and
 re-encode said decoded signal into a second encoding format associated with video-over-Internet Protocol (IP) transmission effective to generate, at least in part, said third video data.

15. A communication system comprising a first terminal configured to communicate with a second terminal connected to a packet-based communication network, wherein:
 the first terminal comprises a memory storing a first communication client application, a first processing apparatus arranged to execute the first communication client application, a first video camera coupled to the first processing apparatus, an alternative video source from a plurality of alternate video sources, other than said first video camera, coupled to the first processing apparatus, and a user input device communicable with the first processing apparatus;
 wherein said first client application is programmed so as when executed to allow a bidirectional video channel to be established between the first terminal and the second terminal over the packet-based communication network, and thereby begin a live, face-to-face video call over the established channel by generating first video data from the first video camera of the first terminal, transmitting the first video data from the first terminal to the second terminal, enabling display of the first video data on a screen of the second terminal, receiving second video data from the second terminal, and displaying the second video data on a screen of the first terminal; and
 the first client application is further programmed to generate third video data at the first terminal from said alternative source, receive a user selection of one or any combination of the plurality of alternate sources from said user input device, and in response to the user selection, enable transmission of, from the first terminal and in addition to the first video data, the third video data to the second terminal over said established channel of the packet-based communication network for display on the screen of the second terminal.

16. The communication system as recited in claim 15, the plurality of alternate sources comprising input associated with an auxiliary input coupled to the first processing apparatus and a television (TV) stream received at the first processing apparatus.

17. The communication system as recited in claim 15, wherein to transmit the third video data includes an ability to transmit a television (TV) stream received by the first processing apparatus, a signal from an auxiliary input coupled to the first processing apparatus, and the first video data from the first video camera in a same session to the second terminal.

18. The communication system as recited in claim 16, the input associated with an auxiliary input comprising input associated with a gaming device.

19. The communication system as recited in claim 15, the first terminal further configured to acquire contact information from a location remote from the first terminal, the contact information configured to enable the bidirectional video channel to be established between the first terminal and the second terminal.

20. The communication system as recited in claim 19, the contact information configured to include a presence status that indicates a presence state of a contact associated with the contact information.

\* \* \* \* \*